Feb. 28, 1950          J. J. BLACK          2,498,847
COUPLING MECHANISM FOR TRACTOR TRAILER COMBINATION
Filed Aug. 9, 1946                              2 Sheets-Sheet 1

INVENTOR.
James J. Black
BY
Wood, Arey, Herron & Evans
ATTORNEYS

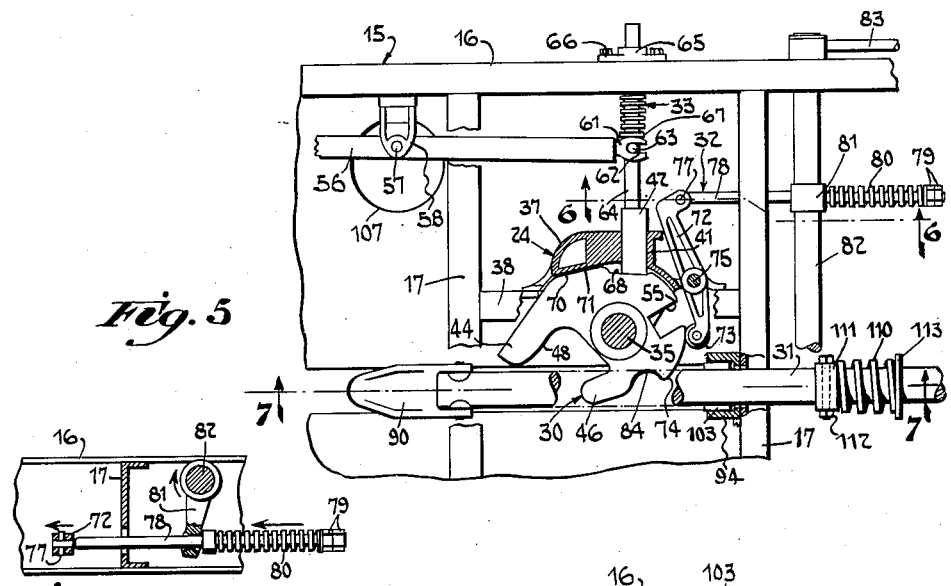

Patented Feb. 28, 1950

2,498,847

UNITED STATES PATENT OFFICE 2,498,847

COUPLING MECHANISM FOR TRACTOR-TRAILER COMBINATION

James J. Black, Cincinnati, Ohio, assignor to The Trailmobile Company, Cincinnati, Ohio, a corporation of Delaware Application August 9, 1946, Serial No. 689,311

20 Claims. (Cl. 280—33.05)

This invention relates to semi-trailers and has particular reference to an improved coupler and its associated mechanism for attaching the trailer to a tractor. More specifically the present apparatus constitutes an improved coupler and also latching means, brake actuating and prop retracting mechanism correlated with the coupler for automatic operation thereof coincidentally with coupling and uncoupling of the trailer.

Briefly, it is the function of the organization to establish a draft connection with a tractor and supplementally, to lower the prop and set the brakes when the vehicle is uncoupled, and to retract the prop, release the brakes and establish a braking connection with the service brake system of the tractor when the vehicles are coupled.

The coupling mechanism of the present application is designed to operate in conjunction with an automatic braking system similar to that disclosed in the copending application of James J. Black for "Braking system for tractor-trailer combinations," Serial No. 681,880, now Patent Number 2,489,117, issued Nov. 22, 1949. The present application embodies an improved single jaw coupler, latching apparatus, and prop actuating mechanism in conjunction with an automatic brake system similar to that of the copending application.

As in the copending application, the present apparatus is arranged to interlock or couple with a king pin carried by a tractor to establish a draft connection between the two vehicles. For this purpose the forward end of the trailer includes a fifth wheel in the form of a flat plate which is provided with a flared longitudinal slot designed to receive the king pin and guide it rearwardly to its final interlocked position in the coupling mechanism. The coupling mechanism is located above and in alignment with the slot and operates automatically to engage and lock the king pin in coupled relation when it reaches its final position, being provided with latching apparatus for this purpose.

In the present organization the guide plate functions as a true fifth wheel as distinguished from that of the previously noted copending application in which the trailer is carried upon a pair of rollers tracked upon the tractor fifth wheel. In the present instance the forward end of the trailer is sustained directly upon the guide plate or fifth wheel which is carried by the tractor. The forward end of the trailer, similar to the copending application, is initially elevated for coupling by means of auxiliary rollers which cooperate with an inclined skid carried by the tractor.

In coupling, the tractor is backed into position and the rollers track upon the skid, elevating the forward end of the trailer and its fifth wheel above the plane of the tractor fifth wheel. In its final movement, the tractor fifth wheel slides under the trailer fifth wheel and the weight of the forward end of the trailer is carried by the respective fifth wheels.

It has been the practice to provide a push rod which is connected to the prop or landing gear, and which is arranged to be actuated by a tractor king pin to elevate or retract prop automatically during the coupling motion of the tractor. This operation commonly has been accomplished by mounting the coupling jaws upon the end of the prop actuating push rod whereby the jaws move longitudinally with the rod in its prop retracting motion. Upon reaching a coupling position, the jaws conventionally slide into some form of stationary housing or bracket which engages the side edges of the jaws and causes them to close, thereby engaging the king pin in the jaws. The mechanism additionally is provided with a latching device which serves to lock the jaws in position within the housing thereby making permanent the coupling engagement of the jaws with the king pin.

This arrangement has certain inherent disadvantages by reason of the fact that the draft connection for the trailer is subject to shocks, sudden overloading and vibrations of considerable magnitude. The coupling jaws, being mounted upon the movable push rod, establish their draft connection intermediately through the housing or other stationary part which engages them, thereby involving looseness due to the necessary clearances between the parts. This necessarily accelerates wear, clatter, and eventual failure of the mechanism due to the shocks and impacts incident to the trailer service being intensified by looseness in the coupling. Moreover, the assembly is relatively complex and expensive due to the number of parts and bearing surfaces requiring accurate machining.

The coupling mechanism of the present apparatus is mounted in a fixed position and directly secured to the trailer chassis, reducing the number of parts, bearing surfaces and thus eliminating looseness. The apparatus provides a more reliable and rigid structure and transmits the draft forces directly from the jaw to a rigid portion of the trailer chassis.

In order to prevent looseness due to wear and to provide resiliency, the present apparatus incorporates a compression spring cooperating with the push rod, the spring serving to resiliently stress or spring load the push rod, urging it constantly in a forward direction. The tractor king pin is engaged by the forward end of this rod and forced forwardly against the jaw, and in this manner is held under spring pressure between the jaw at its forward side and the push rod at its rearward side. The spring loading prevents slack or looseness in the coupling, eliminates shocks, reduces wear and fatigue of the parts, as well as vibration and noise. The spring additionally serves as a shock absorber and cushions or dampens relative movements between the tractor and trailer incident to coupling or when the vehicles are accelerated or braked, results in easier riding and minimizes driver fatigue.

The apparatus has been designed particularly for installation upon trailers of the refrigerator type for hauling perishable merchandise, such as, vegetables and meats. The trailer body is, of course, insulated and the refrigeration may be either by icing the vehicle or by a mechanical refrigeration unit.

It has been the conventional practice to provide an access opening, usually in the form of a trap door, in the floor of the trailer body to permit servicing of the coupler and its associated mechanism. It will be evident that the presence of a trap door constitutes a disadvantage as applied to a refrigerated body because of the possible heat transfer through the opening. Likewise in the instance of a conventional or non-refrigerated trailer body, the trap door is an objectionable feature by reason of the fact that it is necessary to unload the trailer in order to get to the opening should some failure occur necessitating repair or service.

The improved apparatus is designed to be repaired, serviced, or adjusted conveniently from beneath the trailer. For this purpose an access opening is provided in the fifth wheel and the mechanism is designed especially to be conveniently removed from the trailer for inspection or service, thereby eliminating need for any openings in the body of the vehicle, to permit this.

It has, therefore, been an object of the present inventor to provide an improved single jaw coupler of simple and rugged design wherein the unit is secured directly to the chassis of the trailer for making a direct draft connection, with a minimum of parts and elimination of looseness between the king pin and the coupling mechanism.

It has been another object to provide an improved coupling apparatus including a king pin actuated prop retracting device, the prop actuating push rod including cooperating spring means which serves to eliminate clearances between the jaw and king pin and to provide a cushion effect between the tractor and trailer to eliminate shocks and vibration between vehicles.

It has been a further object to provide an improved single jaw coupling mechanism of simple, rugged design, the mechanism being arranged readily to be dismounted for service and repair from beneath the trailer, thereby eliminating openings in the floor of the vehicle.

Further objects and advantages will be more fully set forth in the description with reference to the accompanying drawings in which:

Figure 5 is a fragmentary plan view similar to Figure 1, showing the coupler and associated mechanism in uncoupled position.

Figure 6 is a sectional view taken on line 6—6, Figure 5.

Figure 7 is a sectional view similar to Figure 3, showing the prop push rod in its extended position and the action of a king pin relative to the push rod.

Figure 8 is a view similar to Figure 7, showing the push rod being retracted by the action of the king pin.

Figure 9 is a sectional view taken on line 9—9, Figure 8.

Figures 10 and 11 are fragmentary plan views similar to Figure 8, illustrating the successive positions of the jaw and its associated mechanism in completing the coupling operation.

Figure 1:
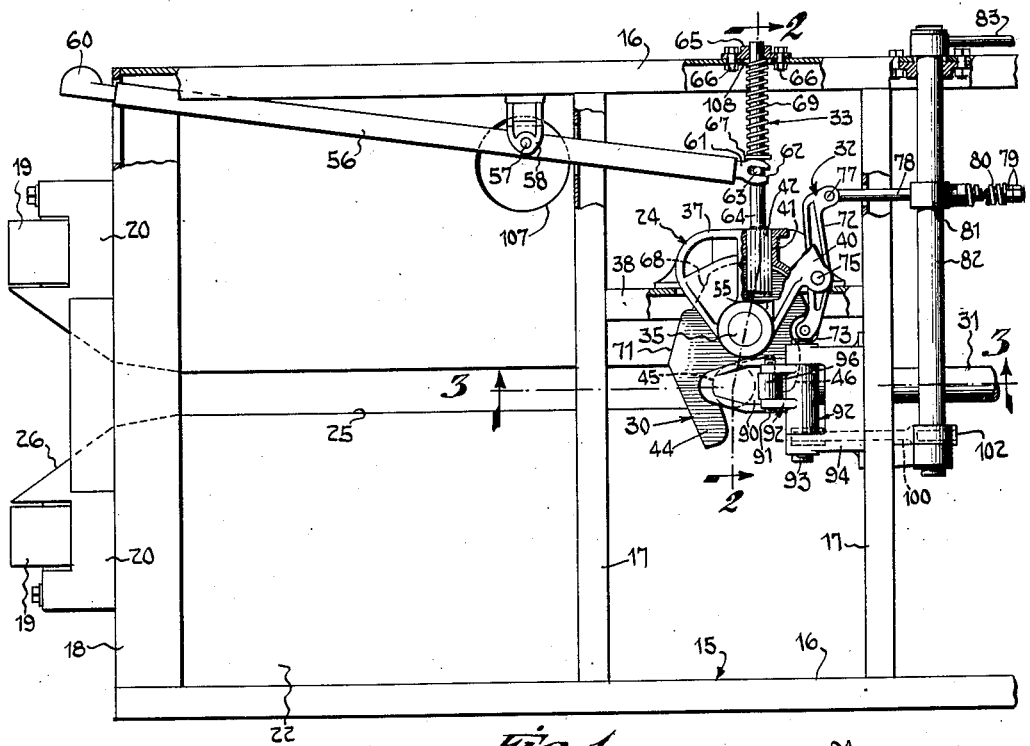
Figure 1 is a fragmentary plan view partially in section of the forward portion of a trailer chassis incorporating the improved coupling mechanism.

Referring specifically to Figure 1, the trailer chassis is indicated generally at 15 and constitutes a pair of parallel longitudinal channel members 16—16 in spaced relationship and joined by cross channel members 17, welded or otherwise secured to the channels 16. The forward end of the chassis includes a cross channel 18 upon which is mounted a pair of rollers 19—19, pivotally mounted in brackets 20, which is bolted or otherwise secured to the channel 18.

The chassis further includes an upper fifth wheel or guide plate 22 disposed beneath the chassis and extending rearwardly to the second cross channel 17 which is located to the rear of the coupling mechanism indicated generally at 24. The fifth wheel 22 includes a longitudinal slot 25 centrally thereof, the forward end of the slot being flared to form a V-shaped opening 26 at the forward edge of the plate. The slot serves to guide the king pin, which is carried upon the tractor or lower fifth wheel, into position for engagement by the coupling mechanism.

The mechanism is adapted for use in conjunction with tractors having a standard commercial style of tilting lower fifth wheel and king pin. Such tractors conventionally include rearwardly inclined skids which are designed to receive the rollers 19 at the forward end of the trailer, the rollers tracking on the upwardly inclined skids onto the inclined fifth wheel as the tractor is driven rearwardly into coupling position with the trailer, thereby serving to raise the forward end of the trailer into coupling position upon the tractor's fifth wheel. As the tractor moves rearwardly with respect to the trailer, the king pin is confined in the slot 25 thereby guiding the king pin in its rearward motion to its appropriate position for engagement by the coupling mechanism. In the latter stages of coupling movement the tractor fifth wheel slides under the trailer fifth wheel and, upon reaching its final position, the king pin is automatically engaged by the coupling mechanism to establish a draft connection between the tractor and trailer.

The apparatus of the present invention involves an improved coupling jaw 30, prop retracting apparatus 31, automatic brake actuating mechanism 32, and latching apparatus 33. The coupling jaw 30 is pivotally mounted upon a headed pivot pin 35 which is screw threaded as at 36 for engagement in a bracket 37. The bracket is secured to a longitudinally disposed channel 38 which is welded or otherwise secured to the cross channels 17. The bracket 37 also provides a bearing support 40 for the automatic brake actuating mechanism hereinafter described and includes a lateral opening 41 forming a guide-way for a latch plunger 42 likewise hereinafter described.

The coupling jaw includes a forwardly disposed finger 44, designed to engage a tractor king pin 45 in coupling position. The jaw further includes a heel or spur 46 rearwardly of the finger 44, the two projecting elements 44 and 46 defining an opening indicated at 48 in which the king pin is received and confined.

The prop actuating push rod 31 is disposed above the coupling jaw and at its forward end includes a downwardly depending lug 49 which engages the spur 46 as shown in Figures 8 and 9. In its coupling movement, with respect to the king pin as shown, the king pin engages the forward end of the push rod 31 forcing it rearwardly, and by virtue of the engagement of lug 49 with spur 46, the coupling jaw pivots in the direction indicated. When the jaw reaches its closed position, it is automatically locked by engagement of the latch plunger 42 with a notch 55 formed in the rearward portion of the jaw. The draft connection between the tractor and trailer is thus established.

Uncoupling of the vehicles is accomplished by manual operation of a lever 56 which is pivotally mounted as at 57 in the bracket 58 secured to the longitudinal channel 16. The forward end of the lever extends beyond the end cross channel 18 and includes a handle 60 for manual operation. The opposite or rearward end of the lever includes a bifurcated portion 61 which is slotted as at 62 to receive a cross pin 63. This pin 63 is secured in a pull rod 64, the inner end of which carries the latch bar 42 which is secured to the rod preferably by welding. The latch bar is slidably confined in the opening 41 of the bracket and the opposite end of the rod 64 is slidably engaged in a bracket 65 secured by bolts 66 to the exterior of the longitudinal channel 16.

A washer 67 is disposed on the rod 64 bearing against the bifurcated element 61. This washer provides a seat for a compression spring 69 disposed upon the rod 64 and having its opposite end seated against the bracket 65. The spring applies the necessary pressure to cause the latch bar 42 to snap into engagement automatically into the notch 55 of the coupling jaw when the jaw reaches its full coupling or closed position. The edge of the jaw on each side of the notch 55 is formed on a radius taken on the center of the pivot pin 35, and the end of the latching plunger 42 rides on this circular surface during coupling movement of the jaw, as shown in Figure 10.

Forwardly of this circular surface, the jaw includes a slightly depressed flat area 68. As shown in Figure 9, upon reaching fully open or uncoupled position, the latching plunger 42 engages this flat area to latch the jaw in its open position. This expedient prevents the jaw from closing and insures that it remains in a fully open position to receive the king pin upon recoupling of the vehicles. This provision is necessary by reason of the fact that, should the jaw for any reason slightly close prior to recoupling, the king pin would be unable to enter the opening 48 and would not make a coupling connection with the jaw.

In its open position, as shown in Figure 5, the jaw contacts the interior wall of the bracket as at 70, the jaw being configurated to include a flat portion 71 which is complementary to the wall surface 70 and serves as a stop or abutment to limit the movement of the jaw.

The present apparatus contemplates the provision of an automatically operated parking brake system similar to that disclosed in the copending application of James J. Black previously noted. For this purpose a cam operated parking brake lever, indicated at 72, is provided having a cam roller 73 pivotally mounted at one end thereof and cooperating with a cam surface 74 formed on the edge of the coupling jaw. The lever is pivotally mounted in the bracket 37 on a pivot pin 75 mounted in the bearing support 40 previously described. The opposite end of the lever is pivotally connected as at 77 to a pull rod 78. This rod includes a pair of adjusting nuts 79 at its opposite end and includes a compression spring 80 having one end bearing against the nuts and having its opposite end bearing against a lever 81 (Figure 6) secured to and extending downwardly from a cross shaft 82. The outer end of the cross shaft 82 includes a lever, not shown, similar to the lever 81 which makes a connection to a brake pull rod 83. The pull rod is in connection with the brake linkage of the wheel brakes at the rear of the trailer as disclosed in the copending application.

As shown in Figures 9, 10, and 11, coupling and uncoupling movements of the jaw 30 cause the lever 72 to rock in the direction determined by the contour of the cam surface 74 formed on the jaw. For this purpose the cam contour provides a recessed portion 84 which permits the brake lever to assume its non-braking position when the coupling jaw is in a closed position as shown in Figure 11. The cam surface adjacent this recess follows the radius struck from the center of the pivot pin 35 of the clamp jaw as previously noted. Therefore, after the initial opening movement of the coupling jaw in uncoupling, as shown in Figure 10, the lever 72 is fully retracted and continued rotation of the coupling jaw does not cause further movement or affect the position of the lever.

Uncoupling movement of the coupling jaw actuates the lever 81 in the direction shown in Figure 6 thereby rotating shaft 82 and causing a forward motion of the brake rod 83 to transmit parking brake pressure to the rear wheels of the trailer. The compression spring 80, disposed on the pull rod 78, permits the brakes to be released when an opposite or retracting force is applied through the main brake rod 83.

The braking system of the trailer is substantially identical to that disclosed in the copending application previously noted and therefore is not disclosed in detail in the present application. The present brake apparatus is designed to operate in the same manner as that disclosed in the copending applicatiion and similarly includes a manually operated brake release mechanism by means of which the pull rod 83 may be drawn rearwardly, thereby rotating cross shaft 82 in unbraking direction. This motion is permitted by the compressibility of the spring 80, there being no change in the position of the cam operated automatic brake setting lever 72. Briefly, the apparatus provides that, upon the trailer being uncoupled, the parking brakes are automatically applied and, upon being recoupled, the brakes are automatically released, with the further provision of a manually operated lever whereby the parking brakes may be released for moving the trailer when it is uncoupled and resting upon its prop or landing gear.

Figures 2, 3:
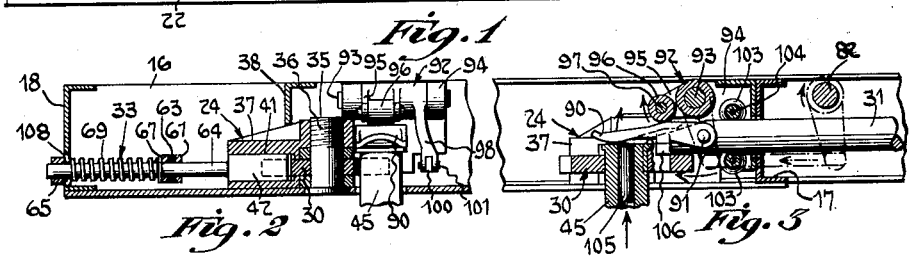
Figure 2 is a sectional view taken on the line 2—2, Figure 1.
Figure 3 is a sectional view taken on line 3—3, Figure 1.

The present apparatus also includes an arrangement for connecting the service brakes of the tractor to the trailer brakes. This arrangement comprises a service brake actuating lever 90 pivotally secured as at 91 to the forward end of the prop actuating rod 31. When the tractor is coupled to the trailer, the king pin forces the prop actuating rod rearwardly to a position as shown in Figure 3. The brake actuating lever 90 is then in a position to cooperate with a bell crank lever 92 pivotally mounted as at 93 upon a bracket 94 secured to the cross channel 17. The upper or horizontal arm 95 of the bell crank lever includes a roller 96 pivotally mounted on the arm as at 97. This roller contacts the brake actuating lever 90 when the trailer is coupled. The depending vertical lever 98 of the bell crank lever is pivotally secured as at 99 to a connecting link 100, the opposite end of which is pivotally connected as at 101 to a lever 102 secured to the cross shaft 82.

The forward end of the prop actuating rod 31 is supported by means of a pair of rollers 103 disposed respectively above and beneath the rod to guide and support the rod with a minimum of friction to facilitate the raising and lowering of the prop. These rollers are respectively pivoted upon cross pins 104 having their opposite ends engaged in the side walls of the bracket 94.

Figure 4:
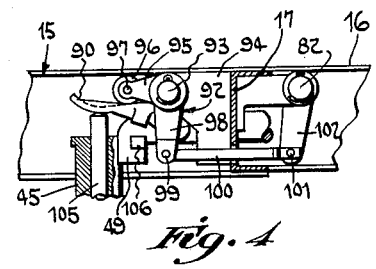
Figure 4 is a fragmentary sectional view similar to Figure 3, showing the king pin of a tractor fifth wheel in coupled relation and illustrating the coupling of the service brake linkage of the tractor to that of the trailer by the thrust rod carried by the king pin.

As shown in Figures 3 and 4, the coupling of the trailer brakes to the tractor service brake system is accomplished by means of a thrust pin 105 carried by the king pin centrally thereof and slidable vertically. The upper end of this rod contacts the brake lever 90 and the lower end of the rod is carried upon a bell crank lever (not shown) which is in operative connection with the service brake pedal of the cab. Upon application of braking pressure, the thrust pin 105 is elevated, as shown in Figures 4, this motion being transmitted to the lever 90, to bell crank lever 92, through link 100, to lever 102, thereby causing the cross shaft 82 to be rotated in the braking direction. This motion is transmitted to the brake pull rod 83 to apply the brakes in the usual manner.

The prop actuating rod 31 includes a stop or abutment 106 which serves to support the brake actuating lever 90 at a predetermined height above the top of the king pin 45 as shown in Figure 7. This arrangement insures that there is adequate clearance to permit the king pin to slide under the lever as it moves into coupling position.

Referring to Figures 5, 7, and 8 of the drawings, the push rod 31 is provided with cushioning means in the form of a compression spring 110. This spring is seated against one of the cross members 17 when the king pin is in coupled position and the push rod thrust rearwardly in prop retracting position. The spring 110 is seated against a collar 111 which is secured to the push rod 31 by means of the bolt 112 extending through the push rod and collar. The opposite end of the spring includes a washer 113 which seats against the cross member 17 when the push rod is retracted as shown in Figure 8. The cross member 17 includes a channel shaped reenforcement 17a preferably welded thereto. This reenforcement compensates for the loss in strength at this point due to the clearance opening 17b to accommodate the push rod and enables the cross member to withstand the thrust of the spring when it is compressed against the channel The spring is of relatively heavy cross section and exerts a spring loading effect against the push rod when it is compressed against the cross member 17. The spring loading occurs in the final rearward motion of the push rod at which stage the end of the spring contacts the cross member 17. The concluding movement of the rod compresses the spring slightly, for example, a distance of ¼ of an inch although this distance may be varied to compensate for spring stiffness or to generate the desired pressure. It will be apparent, however, that the spring exerts a constant pressure against the push rod which in turn is transmitted to the king pin to force the king pin forwardly against the fingers 44 of the coupling jaw. Thus, backlash or looseness in the coupling, as between the king pin and the jaw is virtually eliminated and wear due to relative movements between the parts is materially reduced. The arrangement eliminates vibration and noise and prevents sudden shocks from being transmitted to the coupling jaw due to relative movements between the tractor and trailer during service and thereby increases the life of the mechanism and improves the performance of the trailer generally.

Additionally, sudden changes in the direction of force between tractor and trailer, for example, relative movements occasioned by sudden application of brakes, acceleration, and over-running of the trailer in descending hills are dampened by the spring action. Such shocks being absorbed by the cushioning action of the spring 110, shocks and jolts are prevented from being transmitted to the tractor, thereby improving the riding qualities of the tractor, making it easier to drive and relieving the driver from fatigue.

The mechanism has been especially designed to expedite assembly and the repair or replacement of worn parts. For this purpose an access opening 107 is provided in the fifth wheel to facilitate removal of the pin 57 from the bracket 58 thereby permitting the hand lever 56 to be removed from the trailer. A clearance opening, indicated at 108, is formed in the longitudinal channel 16 through which passes the plunger rod 64. This hole is sufficiently large to permit the plunger 42 to be withdrawn therethrough for inspection, service or replacement. Therefore, upon removal of the bolts 66, the slide bearing 65 is removed and the entire plunger rod and spring assembly, including the latch bar, may be conveniently withdrawn through the opening 108.

The coupling jaw 30 may be conveniently removed by unscrewing and removing the pivot pin 35 upon which it is mounted from beneath the trailer. The fastening means for the bracket 37 and for all of the remaining parts of the assembly likewise are readily accessible from beneath the vehicle. Therefore, the entire mechanism may be inspected, repaired, serviced, or replaced with a minimum expenditure of time, labor, and expense since this may be done without disturbing or removing the load from the trailer.

This is of particular important in the instance of refrigerated trailers hauling perishable merchandise since a delay due to mechanical failures may cause spoilage of the shipment. Since this mechanism may be serviced without access to the interior of the vehicle, the doors need not be opened and thus the refrigeration continues undisturbed. The absence of access openings in the insulated trailer body improves the efficiency of the refrigeration system and the simplicity of design and ready accessibility of the coupler permits the necessary servicing to be done with the utmost dispatch.

Having described my invention, I claim:

1. In a tractor-trailer combination wherein the tractor includes a king pin adapted to cooperate with coupling means on the trailer; a coupling jaw pivotally mounted on the front end of the trailer for swinging movement in a horizontal plane, means on the trailer for guiding the king pin into coupling relationship with the jaw, said jaw including cam means, brake linkage extending from the cam means for actuating the trailer brakes, said cam means effective for operating said brake means to set the brakes when the coupling jaw is swung to uncoupling position, a latch for securing the coupling jaw in coupled position, said latch effective automatically to latch the coupling jaw in coupled position, means for manually releasing said latch, a prop actuating rod guided in the trailer, said prop operating rod actuated by means of the king pin, a service brake operating lever pivotally mounted on the end of the prop operating rod, said king pin including a pin axially thereof adapted to cooperate with the lever for actuating the brake lever on the prop operating rod, and linkage connecting the lever to said brake linkage.

2. In a tractor-trailer combination wherein the tractor includes a king pin adapted to cooperate with coupling means on the trailer; a coupling jaw pivotally mounted on the front end of the trailer for swinging movement in a horizontal plane, means on the trailer for guiding the king pin into coupling relationship with the jaw, a latching mechanism for securing the coupling jaw in coupled position, said latching mechanism effective automatically to latch the coupling jaw in coupled position, means for manually releasing said latching mechanism, a prop actuating rod guided in the trailer, said prop operating rod actuated by means of the king pin, means on the prop actuating rod engageable with the coupling jaw to rotate the jaw to a coupling position as the push rod is retracted, a service brake operating lever pivoted on the end of the prop actuating rod adapted to be disposed over the king pin when the king pin and coupling jaw are coupled, said king pin including a pin axially thereof adapted to cooperate with the lever for actuating said brake lever on the prop operating rod, and linkage connecting the lever to the said trailer brakes.

3. In a tractor-trailer combination wherein the tractor includes a king pin adapted to cooperate with coupling means on the trailer; a coupling jaw pivotally mounted on the front end of the trailer for swinging movement, means on the trailer for guiding the king pin into coupling relationship with the jaw, brake linkage extending from the coupling jaw for actuating the brakes of the trailer, said coupling jaw effective for operating said brake means to set the brakes when the coupling jaw is open, a prop actuating rod guided in the trailer, said prop operating rod actuated by means of the king pin and including a service brake operating lever pivoted on the end of said rod, said king pin including a pin axially thereof adapted to cooperate with the lever for actuating the brake lever on the prop operating rod and, linkage connecting the service brake lever to the brake linkage.

4. In a tractor-trailer combination wherein the tractor includes a king pin adapted to cooperate with coupling means on the trailer; a coupling jaw pivotally mounted on the front end of the trailer for swinging movement, means on the trailer for guiding the king pin into coupling relationship with the jaw, a prop actuating rod guided in the trailer frame, said prop operating rod actuated by means of the king pin, an abutment on the prop actuating rod engageable with the coupling jaw for rotating the jaw to coupling position when the rod is retracted by the king pin, and spring means adapted to maintain the coupling jaw and king pin in snug coupling contact.

5. A coupling device for a semi-trailer or the like adapted to engage a king pin carried by a tractor to establish a draft connection between the tractor and trailer comprising; a coupling jaw; said jaw pivotally mounted upon the forward end of a trailer, a guide plate on the semi-trailer, said plate including a longitudinal slot adapted to confine and guide a king pin into engagement with said jaw, and a retractable prop actuating push rod, said push rod arranged to be retracted by engagement with the king pin during the coupling movement of the king pin, a lug on the push rod adapted to engage the coupling jaw as the rod is retracted by the king pin, said jaw rotatable to coupling position by said lug to engage the king pin, thereby establishing a draft connection between the coupling jaw and king pin.

6. A coupling device for a semi-trailer or the like adapted to engage a king pin carried by a tractor to establish a draft connection between the tractor and semi-trailer comprising; a coupling jaw, said jaw pivotally mounted upon the forward end of a trailer, a guide plate on the semi-trailer, said plate including a longitudinal slot adapted to confine and guide a king pin into engagement with said jaw, a retractable prop actuating push rod, said push rod arranged to be retracted by engagement with a king pin during the coupling movement of the king pin, said push rod including means at its forward end arranged to engage said coupling jaw, to close the jaw in coupled relation with the king pin, spring loading means on said push rod, said means arranged to force the push rod forwardly against the king pin, thereby establishing a yieldable pressure engagement between the king pin and coupling jaw when the king pin is coupled therein.

7. In a semi-trailer of the type including a chassis having brake actuating linkage for the wheels and having a coupling mechanism adapted to couple with a king pin carried by a tractor for making a draft connection therewith comprising; a coupling jaw, the jaw having a recess adapted to receive a king pin, pivotal mounting means for the jaw adapting it to rotate, means for causing rotation of the jaw when a king pin enters said recess, said recess arranged to establish a coupling engagement with the king pin upon rotation, a cam on said jaw, a lever arranged to be actuated by said cam upon rotation of said jaw, said lever being connected to the brake linkage of the trailer to apply the brakes when said coupling jaw is in uncoupled position and to release the brakes when the jaw is in coupled position.

8. A coupling device for a semi-trailer or the like adapted to engage a king pin carried by a tractor to establish a draft connection between the tractor and trailer comprising; a coupling jaw, a mounting bracket for said jaw, said bracket secured at the forward portion of the trailer chassis, a removable pivot pin for said jaw, said pin engaged in said bracket, a guide plate, said plate including a longitudinal slot adapted to confine and guide the king pin into engagement with said jaw, a latching plunger, said mounting bracket including a bore to slidably sustain the plunger and said jaw including a notch to receive the latching plunger and latch the jaw relative to the mounting bracket in coupled engagement with the king pin, and manually operated means for withdrawing said plunger from the notch to release the king pin.

9. A coupling device for a semi-trailer or the like adapted to engage a king pin carried by a tractor to establish a draft connection between the tractor and trailer comprising; a coupling jaw, said jaw pivotally mounted upon the forward end of a trailer, a guide plate, said plate including a longitudinal slot adapted to confine and guide the king pin into engagement with said jaw, a translatable prop actuating push rod, said push rod arranged for translation by a king pin and including a lug at its forward end arranged to engage a portion of said coupling jaw to close the jaw in coupled relation with the king pin, upon engagement and translation of the push rod by the king pin and, means for spring loading said push rod when the jaw is in coupled engagement with a king pin.

10. A coupling device for a semi-trailer or the like adapted to engage a king pin carried by a tractor to establish a draft connection between the tractor and trailer comprising; a coupling jaw, said jaw pivotally mounted upon the forward end of a trailer, a guide plate, said plate including a longitudinal slot adapted to confine and guide the king pin into engagement with said jaw, a translatable prop actuating push rod, said push rod arranged for translation by the king pin and including a lug at its forward end arranged to engage a portion of said coupling jaw to close the jaw in coupled relation with the king pin, a compression spring disposed on said push rod, a stop element for said spring, said spring arranged to engage said stop element to compress the spring, upon engagement and translation of the push rod by the king pin to translate the same and couple the king pin in the coupling jaw, and said compression spring causing spring loading of said push rod to eliminate looseness between the king pin and coupling jaw when the jaw is in coupled position.

11. A coupling mechanism for semi-trailer or the like adapted to engage a king pin carried by a tractor to establish a draft connection between the tractor and trailer comprising; a coupling jaw, a guide plate, said guide plate having a longitudinal slot arranged to receive and guide the king pin into engagement with said jaw, pivotal mounting means for the jaw adapting it to rotate partially, said jaw including a forwardly disposed coupling finger arranged to engage the forward side of a king pin when the coupling jaw is rotated and having a rearwardly disposed spur, a retractable prop actuating push rod arranged to be retracted by engagement with the king pin during its coupling travel, the push rod including a lug at its forward end arranged to engage the rearwardly disposed spur of the coupling jaw to rotate the jaw and cause said forwardly disposed coupling finger to engage the king pin and establish a draft connection therewith.

12. A coupling device for a semi-trailer or the like adapted to engage a king pin carried by a tractor to establish a draft connection between the tractor and trailer comprising; a coupling jaw, said jaw pivotally mounted upon the forward end of a trailer, a guide plate, said plate including a longitudinal slot adapted to receive and guide the king pin into engagement with said jaw, a retractable prop actuating push rod, said rod arranged to be retracted by engagement with the king pin during the coupling travel of the king pin, the push rod including a lug at its forward end arranged to engage a portion of said coupling jaw, to close the jaw in coupled relation with the king pin, the king pin being engaged between the coupling jaw and the end of the push rod, a compression spring disposed on said push rod, a stop element on said push rod adapted to engage the compression spring, and a stationary stop element arranged to engage the opposite end of the spring when the push rod is partially retracted by the coupling travel of the king pin to provide constant spring loading of the push rod and thereby provide a resilient coupling of the king pin to absorb shocks caused by relative movements between the tractor and trailer.

13. A coupling device for a semi-trailer or the like adapted to engage a king pin carried by a tractor to establish a draft connection between the tractor and trailer comprising; a coupling jaw, said jaw pivotally mounted upon the forward end of a trailer, a guide plate, said plate including a longitudinal slot adapted to confine and guide the king pin into engagement with said jaw, said jaw including a recess open to said slot to receive a king pin, pivotal mounting means permitting the jaw to rotate partially when the king pin enters said recess, a prop actuating rod guided in the trailer frame and actuated by the king pin, means on the prop actuating rod for engaging the recess to swing the jaw in coupling position when the rod is retracted by the king pin, latching means for the jaw, said means including a spring pressed plunger, said jaw including a notch to receive the plunger to latch the jaw in closed position upon the king pin thereby coupling the jaw to the king pin, and manually operated means adapted to withdraw the plunger from said notch to permit uncoupling of the jaw.

14. In a semi-trailer including a chassis having brake actuating linkage for the wheels, a coupling mechanism adapted to couple with a king pin carried by a tractor, the king pin including a service brake actuating element and serving to establish a draft and brake control connection between the tractor and trailer; a coupling jaw, a fifth wheel, means for guiding the king pin into engagement with said jaw, a retractable prop actuating push rod, said push rod arranged to be retracted by engagement with the king pin during the coupling travel of the king pin, trailer brake actuating means mounted on the trailer chassis and connected with the trailer brake system, a brake operating lever pivoted on the end of the prop actuating rod and arranged to be actuated by the service brake element of the king pin, and said lever being arranged to cooperate with the trailer brake actuating means when the push rod is retracted and the king pin engaged in the coupling jaw, thereby establishing a brake control connection between the brake control means of the tractor and the trailer brakes.

15. In a semi-trailer including a chassis having brake actuating linkage for the wheels, a coupling mechanism adapted to couple with a king pin carried by a tractor the king pin including a service brake actuating element and serving to establish a draft and brake control connection between the tractor and trailer; a coupling jaw, a guide plate, said guide plate having means arranged to confine and guide the king pin into engagement with said jaw, pivotal mounting means for the jaw adapting it to rotate and engage the king pin, a retractable prop actuating push rod, said push rod arranged to be retracted by engagement with a king pin during the coupling travel of the king pin, a trailer brake actuating lever pivotally mounted on the trailer chassis and connected with the trailer brake system, a brake operating lever pivoted on the end of the prop actuating rod and arranged to be actuated by the service brake actuating element of the king pin, said latter lever being arranged to cooperate with the trailer brake actuating lever when the push rod is retracted and the king pin engaged in the coupling jaw, thereby establishing a brake control connection between the tractor and the trailer brakes.

16. In a coupling device for a semi-trailer or the like adapted to engage a king pin carried by a tractor to establish a draft connection between the tractor and trailer; a removable coupling jaw, a mounting bracket for said jaw, said bracket secured at the forward portion of the trailer chassis, a removable pivot pin for said jaw, said pin in screw threaded engagement in said bracket, to permit removal of said pin and jaw, a spring loaded latch plunger assembly, said mounting bracket including a bore to slidably sustain the plunger said assembly adapted to latch the jaw in coupled position to the mounting bracket, removable bracket for mounting the opposite end of said plunger assembly, said bracket arranged to permit the plunger assembly to be removed as a unit from the coupling mechanism.

17. In semi-trailer including a chassis having wheels at its rearward end, a coupling mechanism adapted to couple with a king pin mounted upon a tractor for establishing a draft connection therewith comprising; a removable coupling jaw, a mounting bracket for said jaw, said bracket secured at the forward portion of the trailer chassis, removable means for pivotally mounting the jaw, said means secured in said bracket and permitting partial rotation of the jaw, to establish a coupling engagement with the king pin a latching plunger, said plunger disposed in said mounting bracket and operable automatically to latch the jaw in coupling position said plunger having a lateral shaft extending through the trailer chassis, a removable bracket for said lateral shaft, said removable bracket mounted on the trailer chassis, spring means disposed on said lateral shaft adapted to urge the plunger against the jaw, the trailer chassis having a clearance hole of a size to permit removal of the plunger shaft and spring means from the trailer as a unit upon dismounting said removable bracket, a manually operated lever for releasing said plunger, said lever removably connected to the plunger, and mounting means for the lever permitting the lever to be removed from the trailer.

18. In a semi-trailer including a chassis having wheels at its rearward end, a coupling mechanism adapted to couple with a king pin mounted upon a tractor for establishing a draft connection therewith; a removable coupling jaw, a mounting bracket for said jaw, said bracket secured at the forward portion of the trailer chassis, removable means for pivotally mounting the jaw, said means secured in said bracket and permitting partial rotation of the jaw, the jaw including a recess adapted to receive a tractor king pin and establish a coupling engagement with the king pin by partial rotation of the coupling jaw, a latching plunger, said plunger slidably engaged in said mounting bracket, the coupling jaw including a notch adapted to receive the end of said plunger to latch the jaw in coupling position and said plunger having a lateral shaft extending through the trailer chassis, removable mounting bracket for said lateral shaft, said removable bracket mounted on the trailer chassis, a spring disposed on said lateral shaft, a collar secured to the shaft for seating said spring, said spring compressed between the bracket and said collar to urge the plunger into said notch the trailer chassis having a celarance hole of a size to permit removal of the plunger shaft and spring from the trailer as a unit upon dismounting said removable bracket.

19. In a tractor-trailer combination wherein the trailer includes brakes and a prop at its forward end and the tractor includes a king pin adapted to cooperate with coupling means on the trailer; a coupling jaw pivotally mounted on the front end of the trailer for swinging movement in a horizontal position, said jaw having a lateral locking slot means on the trailer for guiding the king pin into said internal slot for coupling relationship with the jaw, and prop actuating rod guided in the trailer, said prop actuating rod actuated by means of the king pin and including means engageable in the slot of the jaw for swinging the jaw into king pin coupling position.

20. In a tractor-trailer combination wherein the trailer includes brakes and a prop at its forward end and the tractor includes a king pin adapted to cooperate with coupling means on the trailer; a coupling jaw pivotally mounted on the front end of the trailer for swinging movement in a horizontal position, said jaw having a lateral locking slot means on the trailer for guiding the king pin into said lateral slot for coupling relationship with the jaw, a prop operating rod guided in the trailer and actuated by means of the king pin and including means engageable in the slot of the jaw for swinging the jaw into king pin coupling position and, means for latching said jaw in coupled position said means being automatically set and manually releasable.

JAMES J. BLACK.

REFERENCES CITED

The following references are of record in the file of this patent:

UNITED STATES PATENTS

| Number | Name | Date |
| --- | --- | --- |
| 1,592,832 | La Londe | July 20, 1926 |
| 2,277,179 | Winn | Mar. 24, 1942 |